April 1, 1924.
A. WOLLENSAK
PHOTOGRAPHIC SHUTTER
Filed July 29, 1920      3 Sheets—Sheet 1
1,488,523
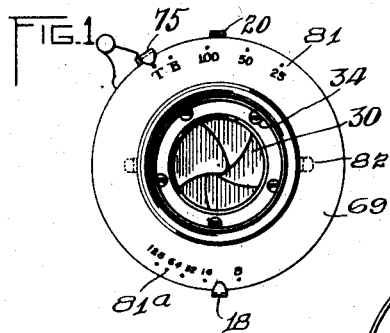
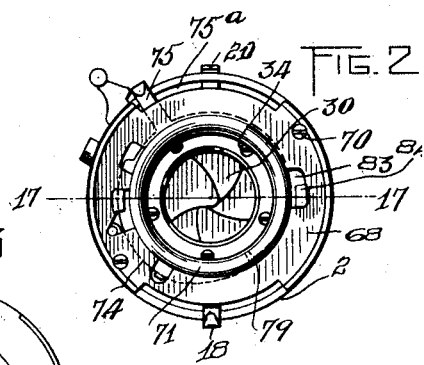
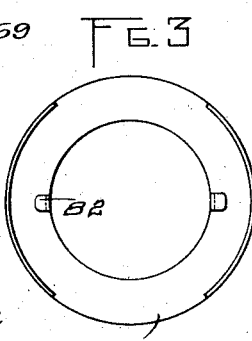
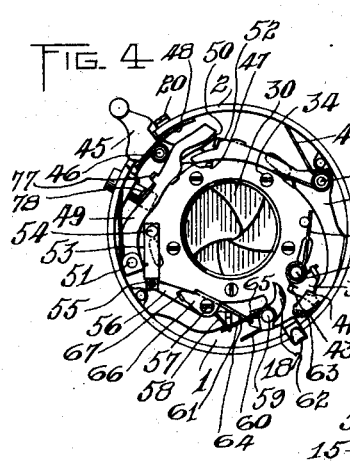
INVENTOR.
Andrew Wollensak
BY
his ATTORNEYS.

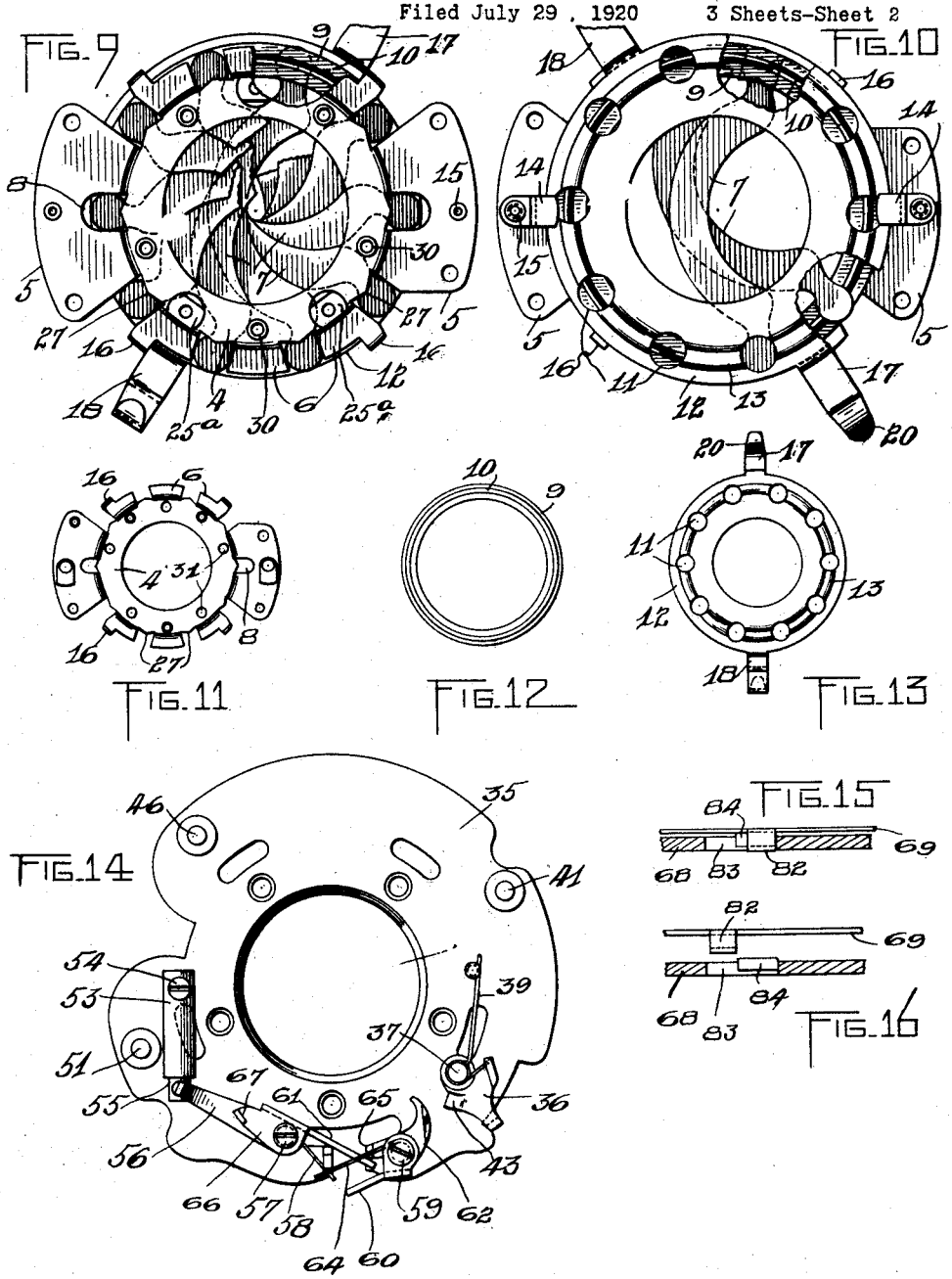

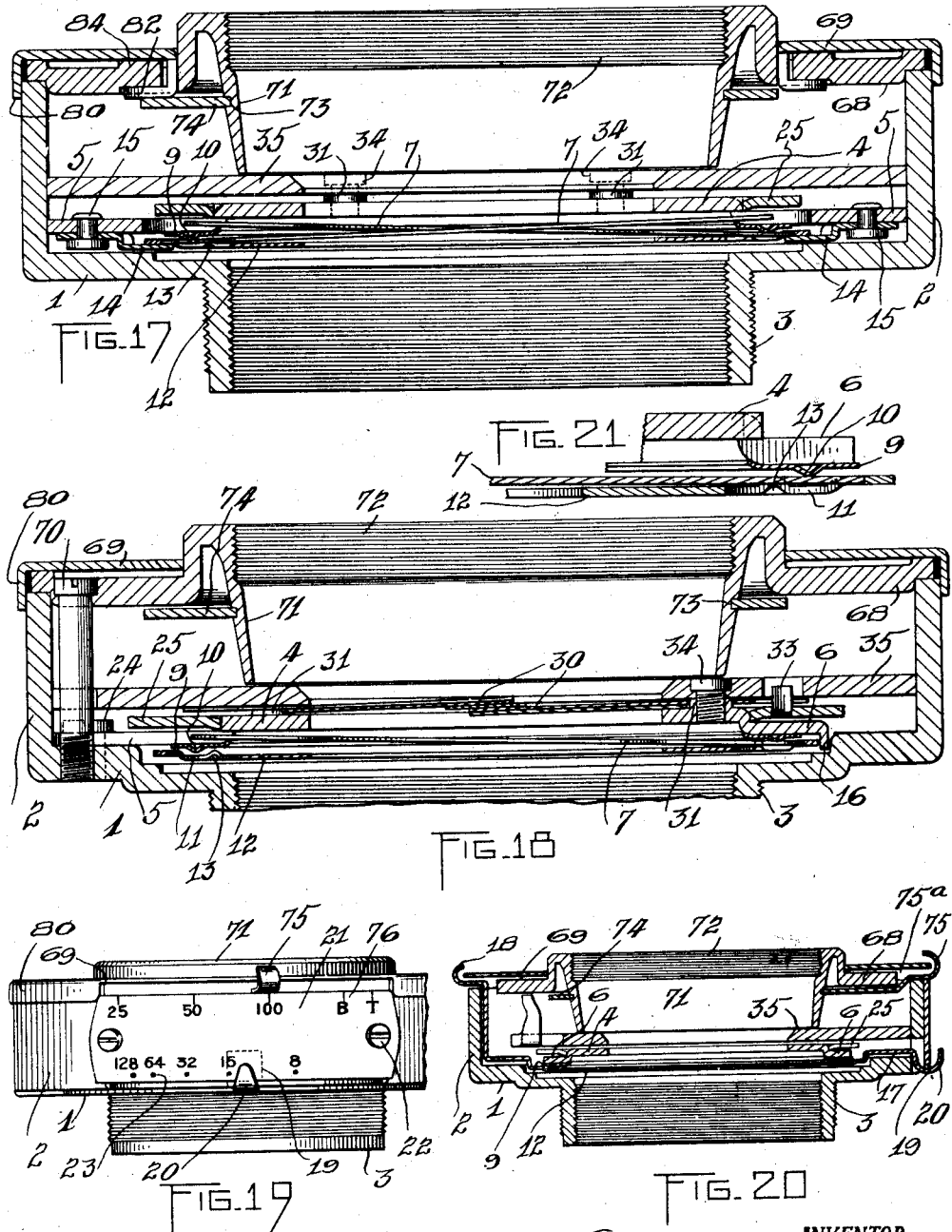

Patented Apr. 1, 1924.

1,488,523

UNITED STATES PATENT OFFICE.

ANDREW WOLLENSAK, OF ROCHESTER, NEW YORK, ASSIGNOR TO WOLLENSAK OPTICAL COMPANY, OF ROCHESTER, NEW YORK, A CORPORATION OF NEW YORK.

PHOTOGRAPHIC SHUTTER.

Application filed July 29, 1920. Serial No. 399,939.

*To all whom it may concern:*

Be it known that I, ANDREW WOLLENSAK, a citizen of the United States, and resident of Rochester, in the county of Monroe and State of New York, have invented certain new and useful Improvements in Photographic Shutters, of which the following is a specification.

The present invention relates to photographic shutters and more particularly to the type in which the iris diaphragm, shutter blades and shutter operating mechanism are incorporated in a housing, an object of this invention being to provide a new manner of associating these parts together so that the manufacture of the shutter is simplified through the making of the assembling operations less difficult. Another object of the invention is to improve the construction of the iris diaphragm. A still further object of the invention is to utilize the supporting plate or ring of the iris diaphragm for the support of the shutter blades of the blade operating ring. A still further object of the invention is to provide the shutter blade pivots on the iris supporting ring or plate and utilize these parts for the support of a plate which in turn supports the operating mechanism of the shutter blades. Another and still further object of the invention is to provide a novel covering means for the casing in which screws or other fastening devices will not be visible at the front face of the casing. Another and further object of the invention is to provide for mounting the indications for the speed of the shutter and the opening of the diaphragm in juxtaposition on the top of the shutter so that the shutter and diaphragm may be adjusted from the rear of the camera.

In the drawings:—

Fig. 1 is a front view of the shutter;

Fig. 2 shows the outer cover ring removed;

Fig. 3 is a rear face view of the outer cover ring;

Fig. 4 is an interior view showing the operating mechanism for the shutter blades;

Fig. 5 is an interior view showing the shutter blades and operating mechanism removed;

Fig. 6 is an interior view showing the operating mechanism for the shutter blades removed and the shutter blades in open position;

Fig. 7 is a view similar to Fig. 6, showing the shutter blades in closed position;

Fig. 8 is an interior view of the shutter casing;

Figs. 9 and 10 are views of opposite faces of the iris diaphragm, parts being broken away;

Fig. 11 is a detail view of the iris supporting plate;

Fig. 12 is a detail view of the spring ring;

Fig. 13 is a detail view of the operating ring of the iris diaphragm;

Fig. 14 is a detail view of the supporting plate for the operating mechanism, the retarding mechanism being mounted thereon;

Figs. 15 and 16 are detail views showing the manner in which the outer cover ring cooperates with the inner cover ring;

Fig. 17 is an enlarged section through the shutter, the shutter operating mechanism being removed;

Fig. 18 is a view through the shutter with the operating mechanism removed and at right angles to the view illustrated in Fig. 17;

Fig. 19 is a fragmentary top view of the shutter;

Fig. 20 is a sectional view through the shutter with the operating mechanism removed, this view being taken at an angle to that illustrated in Fig. 17; and Fig. 21 is a fragmentary view showing the manner in which the blades of the iris diaphragm are held.

Referring more particularly to the drawings, 1 indicates the rear casing wall which has, in this instance, an annular flange 2 on one side thereof forming a chamber. Projecting from the opposite side of the casing wall 1 is an annular flange 3 which is internally and externally threaded, the external threads being provided for the attachment of the shutter to a suitable support and the internal threads being provided for engagement by the rear lens mounting.

Against the rear wall 1 of the casing, the iris diaphragm is supported. This iris diaphragm is not only of novel construction, but the mounting thereof in the shutter casing is novel. It comprises a plate formed with a ring or annular central portion 4 and supporting lugs 5 projected from opposite sides thereof, the supporting lugs being deflected in a plane at one side of the annular central portion 4. Also projected from the periphery of the annular central portion are spaced lugs 6, these lugs also lying in a plane to one side of the annular central portion with the supporting lugs 5. In the spaces between these lugs 6, one of the ends of the iris blades 7 are mounted, the lugs 5 also having openings 8 formed therein for the mounting of two of the blades. In order to hold these ends of the blades in the spaces between the lugs 6 as well as to hold the opposite ends of the blades, a thin flexible ring 9 is provided formed with a pressed up annular rib 10 on one face. The opposite face of the ring abuts the side faces of the lugs 6 so that the ends of the blades will be held in the spaces between said lugs. The opposite ends of the blades are extended through the ring 9 and cooperate with the opposite face of said ring 9, said ends also projecting into openings 11 formed in the operating ring 12, the operating ring having an annular groove 13 in its face opposed to the ring 9 in order to receive said annular projection 10 on said ring 9 so that said ring 9 will also hold the ends of the blades in the openings 11. Overhanging projections 14 are pivotally mounted by eyelets 15 on the lugs 5 and are adapted to swing over the operating ring so as to hold said operating ring as well as the ring 9 to the supporting iris plate. Some of the lugs 6 may be provided with laterally deflected portions 16 for the purpose of guiding the operating ring 12 in its rotary movement. The rotary movement of the operating ring may be effected by two lateral extensions 17 and 18, the former of which extends through a slot 19 in the casing wall 2 and has a portion 20 which overhangs a plate 21 secured by screws 22 to the periphery of the shutter casing, said plate containing indicating matter 23 which will indicate the position of the iris diaphragm. The other lug 18 also acts as an indicator and operating portion for the iris operating ring as will be hereinafter pointed out.

This form of iris diaphragm adapts itself particularly for the building of the iris diaphragm independently of the shutter casing and thereafter to the installation of the same in the casing in completed form. The lugs 5 form the attaching means and are secured to the side wall of the casing by screws 24, the lugs 6 being faced toward the wall of the casing. The opposite face of the iris plate or ring acts as a bearing for the shutter operating ring 25 and also as a support for the shutter blades 30. The shutter operating ring rests on the lugs 6 and turns on the projections 27, the ends of which act as bearings, said projections being arranged between the lugs 6 and the lugs 5 and also in the openings 8 of said lugs 5. The ring 25 is held to the iris plate 4 preferably by devices 25ª which are rotatably mounted on the plate or ring 4 within the ring 25 to move toward and from a position where portions overhang the said ring 25. Projections 28 and 29 form stops for limiting the rotary movement of the ring 25. The blades 30 are pivoted at 31 to the iris plate 4 and have slots 32 receiving projections 33 on the operating ring 25 so that the rotation of the operating ring 25 effects the opening and closing of the shutter blades.

The projections or posts 31 in addition to forming pivots for the blades 30 act as anchoring posts for screws 34 which secure a supporting plate 35 in abutment with the ends of the projections or posts 31 so that said supporting plate 35 lies in spaced relation to the iris plate 4 in order to provide a space between the supporting plate and such iris plate in which the blades 30 may operate. The supporting plate supports the blade operating mechanism, and to this end carriers an exposure lever 36 on its uppermost face pivotally mounted on a post 37 and having its end turned downwardly and operating in a slot 38 formed in the limiting stop 29 of the operating ring 25. A spring 39 surrounds the post and connects with the lever 36 in order to give the blades a tendency to move normally to closed position. A master lever 40 pivoted at 41 has a projection 42 which cooperates with a projection 43 on the exposure lever in order to move such exposure lever to such a position that the projection 42 of the master lever eventually moves out of connection with the projection 43 on the exposure lever. The master lever yields laterally in order to ride over said projection 43 on the exposure lever when the master lever is moved in the opposite direction, this being provided in order that connection may be established between the projection 42 and the projection 43. A spring 44 acts on the master lever to hold it in the position illustrated in Fig. 4. Movement of the master lever against its spring 44 may be effected by an operating member 45 extending to the exterior of the shutter casing, pivoted at 46 and having a lateral projection 47 which will cooperate with the upper end of the master lever to move the latter until the projection 43 rides off the end of the master lever. This end of the master lever also yields laterally in order that the operating member 45 may be returned to normal position under the action of its spring 48. The return movement of the master lever may be controlled in any suitable manner as by two detents 49 and 50, both pivoted upon a common pivot 51, the detent 49 controlling the master lever for bulb exposures and the detent 50 controlling the master lever for time exposures, both of said detents cooperating with the projection 52.

There may also be mounted on the supporting plate a retarding mechanism for retarding the action of the master lever. This retarding mechanism in this instance comprises a cylinder 53 pivoted at 54 to the supporting plate and having a piston 55 operable therein and connected to one arm 56 of a three arm lever which is pivoted at 57 to the supporting plate. A spring 58 acts on this lever and normally returns the piston to its position within the cylinder. A two arm connecting lever is also pivoted to the plate at 59 and has one arm 60 engaging the arm 61 of the three arm lever, and an arm 62 adapted for engagement by an inwardly turned projection 63 on the adjacent end of the master lever 40. A spring 64 acts on the retarding lever 60—62 and holds the stop 65 thereon against an abutment formed on the plate 35. When the master lever is moved under the action of its operating lever 45, its end 63 rides over the arm 62 until it passes behind said arm. On the return movement of the master lever under the action of its spring 44, the master lever and the retarding lever 60—62 move together until such a time that the master lever rides off the end of said retarding lever 60—62. During the movement of the lever 60—62, the latter engages with the arm 61 of the three arm lever and pulls the piston 55 out of the cylinder 54, thus retarding the closing action of the shutter. Upon the release of the retarding lever 60—62, the springs 58 and 64 return said levers to their normal positions. The control of the retarding mechanism is preferably effected through the third arm 66 of the three arm lever which has a projection 67 controlled in a manner to be hereinafter set forth.

The casing is closed by a cover formed by two annular members 68 and 69. The annular member 68 is secured in place by a number of screws 70 which extend through said member 68 into the casing 1 as shown in Fig. 18. This member is formed with an outwardly and inwardly turned flange 71 which is internally threaded at 72 for the securing of one of the lens elements. It is also provided with an annular groove 73 on its exterior within the casing and in this groove a controlling ring 74 is mounted to turn, this controlling ring having a portion 75 bent through a recess 75ª in the member 68 and extending to the exterior of the casing, whereby the controlling member 74 may be turned from the exterior of said casing. This portion 75 operates adjacent a scale 76 on one edge of the plate 21 which also carries the indications 23 for the iris diaphragm. By this arrangement, the indications for the speed of the shutter as well as for the iris diaphragm may be viewed from the edge of the shutter at the top thereof so that the user of the camera may adjust the shutter while standing in rear of the camera, and just prior to focusing. The controlling member 74 cooperates with the projection 67 on the three arm retarding lever to control the retarding action in a manner well known in this art. This controlling member also cooperates with projections 77 and 78 formed respectively on the bulb detent 49 and the time detent 50 to control the shutter for bulb and time exposures in a manner well known in the art. This ring 74 is split at 79 so as to facilitate its being fitted about the flange 71. The outer cover member 69 is provided with a surrounding flange 80 which fits about the flange 2 of the casing. It may also be provided with indications 81 over which the operating and indicating portion 75 of the controlling member 74 may travel so that the shutter may be adjusted for speed from the front of the camera as well as from the top thereof. It may further be provided with indications 81ª over which the index or pointer 18 travels. The plate 69 is preferably held to the plate 68 by providing the former with downwardly and inwardly turned projections 82 at diagrammatically opposite points at the inner periphery of the ring. These projections or lugs 82 are adapted to pass through bayonet slots or openings 83 in the member 68 and then upon the rotation of said cover member 69 to engage under the portions 84 provided on the cover member 68, thus interlocking the cover member 69 to the cover member 68.

It is apparent that the construction of the iris diaphragm permits the latter to be assembled independently of the shutter casing and thereafter to be fitted to the casing in its assembled form. The supporting plate or ring of the iris diaphragm acts as a support for the pivots of the blades as well as a bearing for the blade operating ring. The blade pivots also act as spacing means and supports for holding the plate which carries the blade operating mechanism in spaced relation to the blades. The front plate of the casing is secured by a means which is invisible from the front of the camera. This front plate together with another plate forms the covering means for the casing, the front plate having lugs thereon which interlock with the under plate by a rotary movement of the front plate on such under plate. The under plate is secured in position by screws which are covered by the front plate. This under plate also supports the lens mounting and has a portion projecting forwardly therefrom through the opening in the outer plate. The under plate also supports the annular setting ring which is mounted to turn on an annular flange projected inwardly from the under plate. Indicating means for the speed of the shutter and for the diaphragm opening are arranged on the edge of the shutter casing at the top of the latter in proximity to each other so that the indexes of the iris diaphragm and the shutter controlling ring or member operate thereover. In this instance, the two indicating means are mounted along opposite edges of a plate which is secured to the top of the casing, the diaphragm index operating on the rear side of said plate and the index of the shutter controlling ring operating on the front side of said plate. The index of the shutter controlling ring also operates over indications on the front or cover wall of the casing, and this front or cover wall of the casing is also provided with another indicating means with which a second index connected to the iris diaphragm cooperates.

What I claim as my invention and desire to secure by Letters Patent is:

1. In a photographic shutter, the combination with a casing, an iris-supporting ring detachably secured in the casing, an iris-operating ring arranged on one side of the supporting ring, shutter blade bearings projecting from the opposite side of said supporting ring, blades pivoted on said bearings, and an operating ring having bearing on that side of the iris-supporting ring on which the blades are mounted.

2. In a photographic shutter, the combination with a casing, an iris-supporting ring detachably secured in the casing, an iris-operating ring arranged on one side of the supporting ring, shutter blade bearings projecting from the opposite side of said supporting ring, blades pivoted on said bearings, an operating ring having bearing on that side of the iris-supporting ring on which the blades are mounted, a supporting plate mounted on the blade bearings, and operating mechanism for the shutter blades mounted on said supporting plate.

3. A photographic shutter comprising a casing, an iris-supporting ring detachably secured in the casing, an iris-operating ring mounted to turn on one side of said supporting ring, iris blades connecting said supporting ring and said operating ring, a shutter operating ring having bearings on the opposite side of said supporting ring, and shutter blades pivoted to the iris-supporting ring and to the shutter operating ring.

4. A photographic shutter comprising a casing, an iris-supporting ring detachably secured in the casing, an iris-operating ring mounted to turn on one side of said supporting ring, iris blades connecting said rings, a shutter operating ring having bearing on the opposite side of said iris-supporting ring, pivot posts for shutter blades having screw threaded openings, shutter blades mounted to turn on said posts and connected to said shutter operating ring, a supporting plate, screws connecting said supporting plate with the pivot posts, and blade operating mechanism mounted on said supporting plate.

5. A photographic shutter comprising a casing, an iris-supporting plate detachably mounted in the casing and having projections at its edge bent in one direction and bearing projections between said first mentioned projections, iris blades having their ends mounted between the first named projections, an iris-operating ring connected to the other ends of the blades, a blade operating ring mounted on the opposite side of the iris-supporting plate and engaging with said bearing projections, and shutter blades pivotally connected to said supporting plate.

6. In a photographic shutter, a casing having an exposure opening, shutter blades for controlling said opening, blade operating mechanism in the casing, means mounted on the casing provided with bayonet slots, and a closure ring for the casing having lugs at its inner periphery with laterally turned portions for interlocking with the walls of the bayonet slots.

7. In a photographic shutter, a casing having an exposure opening, shutter blades for controlling said opening, blade operating mechanism in the casing, a member secured to the casing and having a portion for receiving the lens mounting projecting from the face thereof, and a ring cover surrounding the projecting portion of said member and having lugs for detachably interlocking with said member.

8. A photographic shutter comprising a casing, an iris-supporting ring detachably secured in the casing, an iris-operating ring mounted to turn on one side of said supporting ring, iris blades connecting said supporting ring and said operating ring, a shutter operating ring having bearing on the opposite side of said supporting ring, shutter blades pivoted to the iris-supporting ring and to the shutter operating ring, and devices mounted on said supporting ring for securing the shutter operating ring to the supporting ring.

ANDREW WOLLENSAK.